United States Patent
Bhattacharya et al.

(10) Patent No.: US 8,370,275 B2
(45) Date of Patent: Feb. 5, 2013

(54) DETECTING FACTUAL INCONSISTENCIES BETWEEN A DOCUMENT AND A FACT-BASE

(75) Inventors: Indrajit Bhattacharya, New Delhi (IN); Tanveer Afzal Faruquie, New Delhi (IN); Shantanu Godbole, New Delhi (IN); Mukesh Kumar Mohania, Agra (IN); Ullas Balan Nambiar, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 12/494,399

(22) Filed: Jun. 30, 2009

(65) Prior Publication Data

US 2010/0332424 A1      Dec. 30, 2010

(51) Int. Cl.
- *G06F 17/27* (2006.01)
- *G06F 17/30* (2006.01)
- *G06F 17/21* (2006.01)

(52) U.S. Cl. ............... 706/12; 706/45; 706/46
(58) Field of Classification Search ............ 706/12
See application file for complete search history.

(56) References Cited

U.S. PATENT DOCUMENTS

| 7,343,295 B2 | 3/2008 | Pomerance |
| 2004/0122846 A1* | 6/2004 | Chess et al. ............ 707/102 |
| 2007/0136251 A1 | 6/2007 | Colledge et al. |

FOREIGN PATENT DOCUMENTS

WO    WO 2005/020092    3/2005

OTHER PUBLICATIONS

Harabagiu et al., Negation, Contrast and Contradiction in Text Processing, pp. 755-762, ACL 2007.
Lin et al., Are These Documents Written from Different Perspective? A Test of Different Perspectives Based on Statistical Distribution Divergence, Proceedings of the 21st International Conference on Computational Linguistics and 44th Annual Meeting of the ACL, pp. 1057-1064, Jul. 2006.

* cited by examiner

*Primary Examiner* — Jeffrey A Gaffin
*Assistant Examiner* — Nathan Brown, Jr.
(74) *Attorney, Agent, or Firm* — Ryan, Mason & Lewis, LLP

(57) ABSTRACT

Techniques for identifying one or more inconsistencies between an unstructured document and a back-end fact-base are provided. The techniques include automatically parsing a query document and comparing the document with a back-end fact-base comprising facts relevant to the document, identifying one or more inconsistencies between information mentioned in the document and the facts stored in the back-end fact-base, and providing a response to the query document, wherein the response additionally includes the one or more identified inconsistencies.

18 Claims, 2 Drawing Sheets

DETECTING FACTUAL INCONSISTENCIES BETWEEN A DOCUMENT AND A FACT-BASE

FIELD OF THE INVENTION

Embodiments of the invention generally relate to information technology, and, more particularly, to detecting inconsistencies between documents and a known fact-base.

BACKGROUND OF THE INVENTION

Take the instance of a customer writing a complaint to an enterprise or company regarding a defect in a product she recently purchased. She wants the enterprise to replace the product, as she believes the product is still covered by the warranty. However, a customer's (or user's) complaint may not reflect the truth about the warranty or, perhaps the particular condition for which replacement is asked for may not be covered under the warranty.

Relevant sources of information can include a fact-base containing factual information about the various warranties and contracts supported by the enterprise, as well as possibly a customer-generated document containing implicit references to the facts contained in the fact-base.

In existing approaches, the agent at the service desk handling the customer complaint will have to manually search for the relevant facts and assess whether the facts mentioned by the customer match the facts in the enterprise fact-base and respond accordingly. As a result, the response may be delayed by hours, during which the customer is expecting a favorable reply.

SUMMARY OF THE INVENTION

Principles and embodiments of the invention provide techniques for detecting factual inconsistencies between a document and a fact-base. An exemplary method (which may be computer-implemented) for identifying one or more inconsistencies between an unstructured document and a back-end fact-base, according to one aspect of the invention, can include steps of automatically parsing a query document and comparing the document with a back-end fact-base comprising facts relevant to the document, identifying one or more inconsistencies between information mentioned in the document and the facts stored in the back-end fact-base, and providing a response to the query document, wherein the response additionally includes the one or more identified inconsistencies.

One or more embodiments of the invention or elements thereof can be implemented in the form of a computer product including a tangible computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
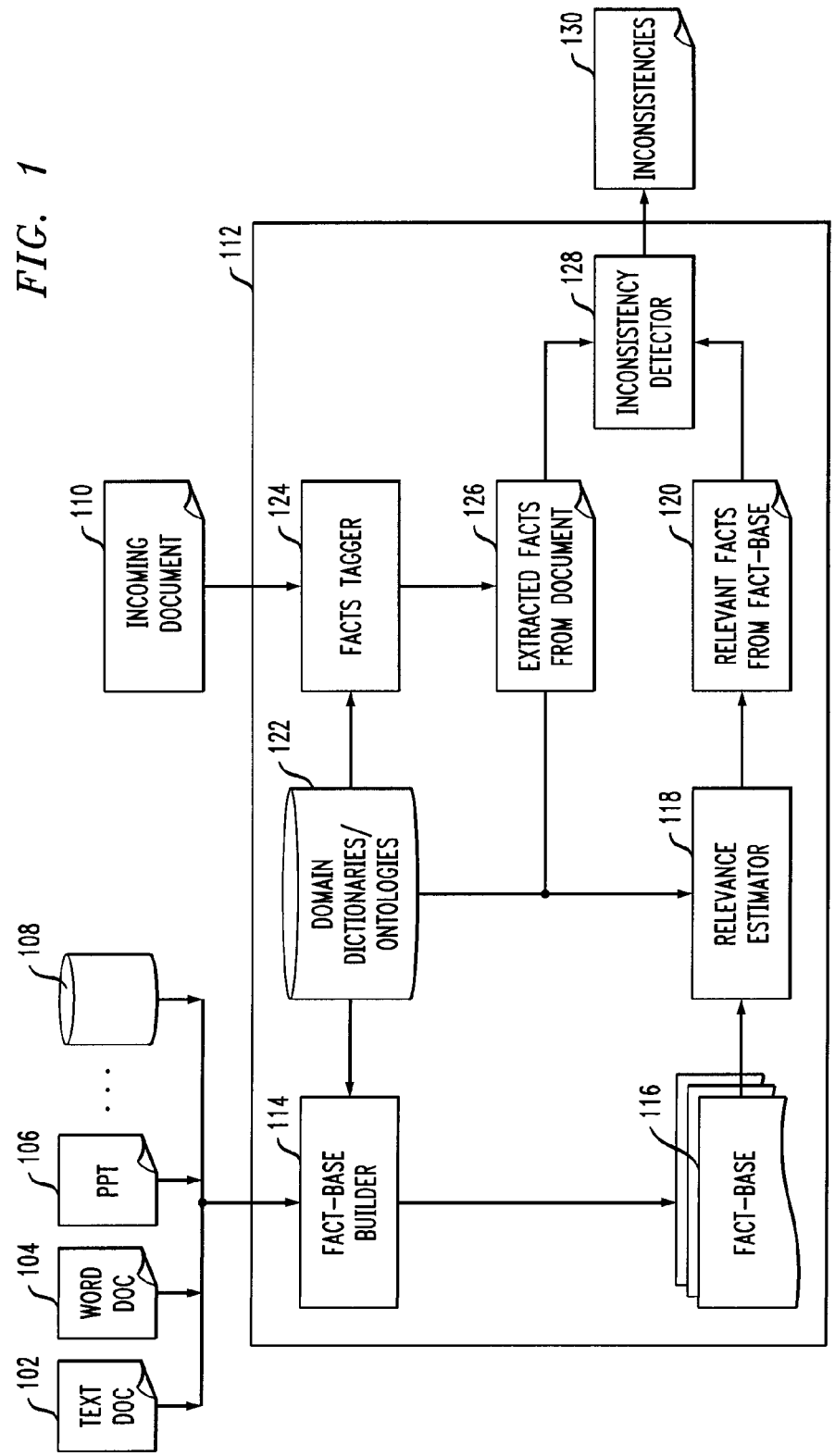
FIG. 1 is a diagram illustrating exemplary architecture, according to an embodiment of the present invention.

Principles of the invention include detecting factual inconsistencies between documents and a fact-base (that is, a database containing previously verified facts). As described herein, one or more embodiments of the invention include detecting factual inconsistencies between an unstructured document and a back-end data collection that includes unstructured and/or semi-structured documents. The techniques detailed herein can include creating an internal fact-base from the back-end data collection, extracting relevant facts from an incoming unstructured document and detecting consistency between back-end and incoming facts.

One or more embodiments of the invention include parsing a query or complaint from a customer and comparing the query with a fact-base including information associated with the query without human intervention. Also, the techniques described herein include identifying inconsistencies between the facts mentioned in the query and the facts stored in the fact-base, providing a response to the query based on the fact-base, and presenting the inconsistencies/response to the customer.

In one or more embodiments of the invention, given sources (text documents, fact-bases, etc.) containing facts, facts can be extracted from the sources by identifying fact triples in the form of <entity, attribute, value> or <entity, entity, relationship>, and loaded into an extensible markup language (XML) fact-base. Additionally, the techniques described herein can also (in real-time, for example), given the XML fact-base and an incoming document (email, transcript, invoice, etc), segment the document. For each segment, the relevant set of facts can be determined by mapping tokens in the segment to elements of fact triples in the fact-base. Also, for each relevant fact for a segment, a decision can be made as to if there is an inconsistency between them. Additionally, the most relevant and contradictory/compliant facts for the document can be reported (for example, to a user and/or customer).

Unlike existing approaches, one or more embodiments of the invention include the capability to check for inconsistencies over more general facts (triples) and using document collections rather than individual documents. Additionally, the techniques detailed herein do not require a user's help to prepare a structured complaint or require an enterprise or company to provide structured problem-solution sets and enterprise rules, thereby significantly reducing the resolution time and enhancing usability. Also, one or more embodiments of invention extract facts and check for consistency without requiring a fixed fact template to be provided. Accordingly, the techniques described herein can be used in many scenarios other than complaint resolution, such as, for example, unstructured case-based reasoning, automated exam evaluation given a textbook, detecting inconsistent facts in product discussion forums given product manuals, etc.

As described herein, one or more embodiments of the invention include determining inconsistency and compliance. The set of fact triples from the relevant facts can be compared with the list of attribute and their (perhaps partial) list of values extracted from a document. For each attribute in the document's list, corresponding triple elements from the fact book can be considered. Also, the techniques detailed herein include determining whether the value in the document contradicts value in the fact-book. Different cases, such as, for example, null, star, negations, multi-valued attributes, semantic distances using ontologies, etc., can be considered. As such, a sentence in document is declared to be inconsistent if any value is inconsistent with the fact-book.

Also, the techniques detailed herein include creating a fact-base from master documents. Formally, a fact-book is a set or collection of facts, where each fact is represented as a triple. The triple may be interpreted in multiple ways. Possible interpretations include, for example, <entity, attribute, value>, <entity, entity, relationship>, and <attribute, value, qualifier>. Additionally, an unstructured master document can be transformed into a semi-structured (XML) format by extracting the relevant triples. In one or more embodiments of the invention, both automatic and manual approaches (where master documents are small in size and few in number) are possible.

FIG. 1 is a diagram illustrating exemplary architecture, according to an embodiment of the present invention. By way of illustration, FIG. 1 depicts sources such as a text document 102, a Word document 104, a PowerPoint (PPT) 106 as well as additional sources 108. FIG. 1 also depicts a system 112 that includes a fact-base builder component 114, a fact-base 116, a relevance estimator component 118, relevant facts from the fact-base 120, domain dictionaries and/or ontologies 122, a facts tagger component 124, extracted facts from a document 126 and an inconsistency detector component 128.

Sources (such as, for example, 102, 104, 106 and 108) are provided as input to the fact-base builder component 114, along with domain dictionaries and/or ontologies 122, which also provide input to the fact-base builder component. The fact-base builder component 114 generates a fact-base 116, which provides input to the relevance estimator component 118 (which also receives input from domain dictionaries/ontologies 122).

As also depicted in FIG. 1, an incoming document 110 is provided as input to the facts tagger component 124 (which also receives input from domain dictionaries/ontologies 122). The incoming documents contain sentences written in natural language that may refer to the facts in the fact-base using elements of the fact triple and potentially contradict the facts. The facts tagger component 124 generates extracted facts 126 from the incoming document, which are provided as input to the relevance estimator 118, which generates relevant facts 120 from the fact-base. The relevant facts 126 and 120 are provided as input to the inconsistency detector component 128, which generates inconsistencies 130.

In one or more embodiments of the invention, an exemplary fact-base generated from a terms-and-conditions document containing the following facts.

1. 2 free transactions are allowed on Bank (B) ATMs per month

2. Rs 25 will be charged per transaction on your B ATM . . . may look as follows:

```
<Factbook>
  <Fact ID=1>
    <Attribute>Free Transactions</Attribute><Value>2</Value>
    <Attribute>ATM</Attribute><Value>B</Value>
    <Qualifier>Per Month</Qualifier>
  </Fact>
  <Fact ID =2>
    <Attribute>Charge</Attribute><Value>Rs 25 </Value>
    <Attribute>ATM</Attribute><Value>B</Value>
    <Qualifier>Per Transaction</Qualifier>
  </Fact>
  ...
</Factbook>
``` where the two clauses in the terms and conditions document have been converted to the internal triple representation of facts by extracting the attributes, values and qualifiers.

Additionally, in one or more embodiments of the invention, an exemplary document and detected inconsistencies can include the following. Given a customer complaint of "I was charged for withdrawing from the Bank (B) ATM (automated teller machine), and I thought I am allowed six free transactions," the following partial fact-triplet may be extracted from the document:
<Attribute>free transactions</Attribute><Value>6</Value>
This fact can then be determined to be in contradiction with the following fact in the back-end fact-base, and reported accordingly.

```
<Fact ID=1>
  <Attribute>Free Transactions</Attribute><Value>2</Value>
  <Attribute>ATM </Attribute><Value>B</Value>
  <Qualifier>Per Month</Qualifier>
</Fact>
```

Similarly, the document "It is two months since I bought the camera. It should be covered by warranty for 6 months" can be determined to mention the following fact:
<Attribute>warranty</Attribute><Value>6 months</Value>
which can then be determined to be in contradiction with the following fact in the fact-base:

```
<Fact ID=1>
  <Attribute>Warranty period</Attribute><Value>1 month</Value>
  <Qualifier>from date of purchase</Qualifier>
</Fact>
```

Figure 2:
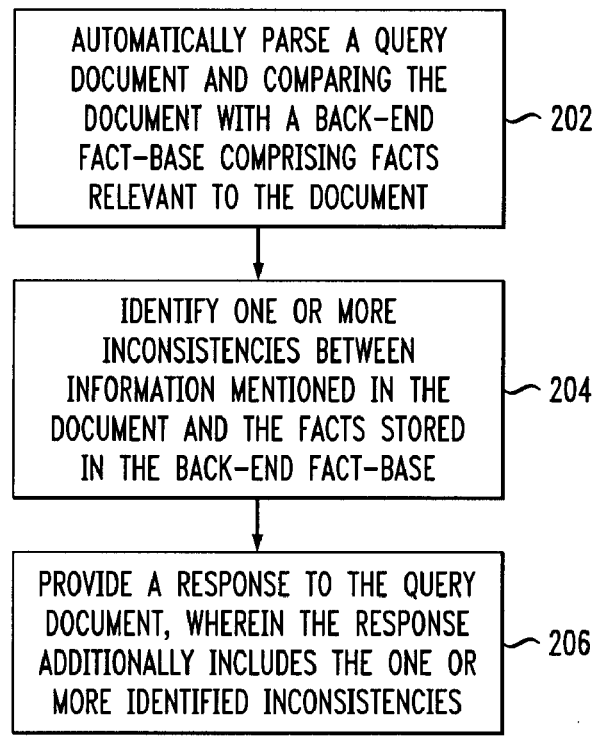
FIG. 2 is a flow diagram illustrating techniques for identifying one or more inconsistencies between an unstructured document and a back-end fact-base, according to an embodiment of the invention.

FIG. 2 is a flow diagram illustrating techniques for identifying one or more inconsistencies between an unstructured document and a back-end fact-base, according to an embodiment of the present invention. The back-end fact-base can include, for example, unstructured and semi-structured documents. Step 202 includes automatically parsing a query document (or a complaint) (for example, a query from a customer) and comparing the document with a back-end fact-base comprising facts relevant to the document (for example, without human intervention). Comparing the document with a back-end fact-base can include determining relevant facts from the back-end fact-base given the facts contained in the query document. Also, determining relevant facts can include identifying fact triples in the back-end fact-base and the query document.

Step 204 includes identifying one or more inconsistencies (or contradictions) between information mentioned in the document (for example, in each parsed segment of the query) and the facts stored in the back-end fact-base. Step 206 includes providing a response to the query document, wherein the response additionally includes the one or more identified inconsistencies.

The techniques depicted in FIG. 2 can also include presenting the response to a user. Further, one or more embodiments of the invention can include constructing an extensible markup language back-end fact-base from one or more source documents and/or one or more fact-bases.

The techniques depicted in FIG. 2 can also, as described herein, be run on a system, wherein the system includes distinct software modules, each of the distinct software modules being embodied on a tangible computer-readable recordable storage medium. The distinct software modules can include, for example, a fact-base builder component, a relevance estimator component, a facts tagger component and an inconsistency detector component executing on a hardware processor.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 3:
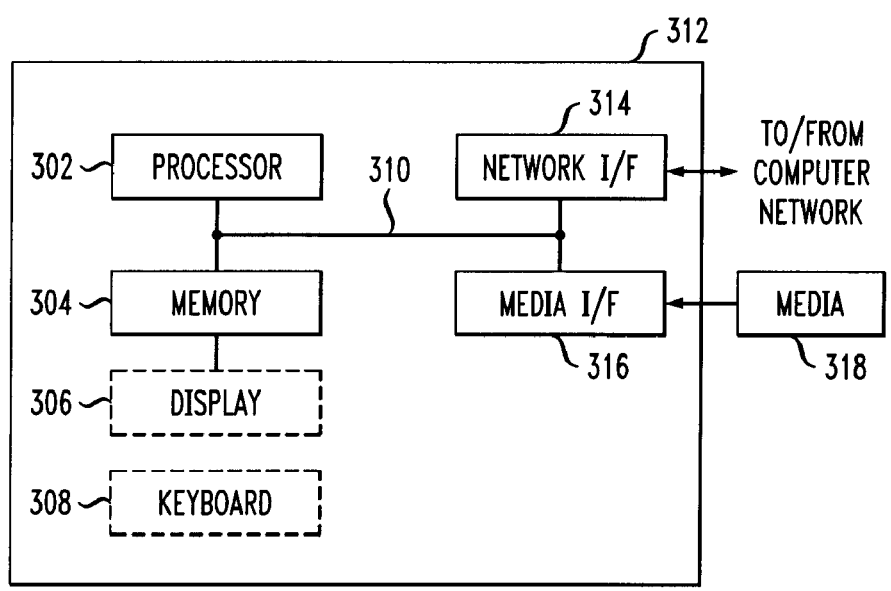
FIG. 3 is a system diagram of an exemplary computer system on which at least one embodiment of the invention can be implemented.

One or more embodiments can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

Furthermore, the invention can take the form of a computer program product accessible from a computer-usable or computer-readable medium (for example, media 318) providing program code for use by or in connection with a computer or any instruction implementation system. For the purposes of this description, a computer usable or computer readable medium can be any apparatus for use by or in connection with the instruction implementation system, apparatus, or device. The medium can store program code to implement one or more method steps set forth herein.

The medium can be an electronic, magnetic, optical, electromagnetic, infrared, or semiconductor system (or apparatus or device) or a propagation medium. Examples of a tangible computer-readable storage medium include a semiconductor or solid-state memory (for example memory 304), magnetic tape, a removable computer diskette (for example media 318), a random access memory (RAM), a read-only memory (ROM), a rigid magnetic disk and an optical disk (but exclude a propagation medium). Current examples of optical disks include compact disk-read only memory (CD-ROM), compact disk-read/write (CD-R/W) and DVD.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium; the modules can include any or all of the components shown in FIG. 1. The method steps can then be carried out using the distinct software modules and/or sub-modules of the system, as described above, executing on a hardware processor. Further, a computer program product can include a tangible computer-readable storage medium with code adapted to be executed to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, identifying inconsistencies between facts contained in a query document and facts stored in a fact-base, provide a response to the query based on the fact-base, and presenting the response to a user.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for identifying one or more inconsistencies between an unstructured document and a back-end fact-base, wherein the method comprises:
   automatically parsing a query document and comparing the document with a back-end fact-base comprising facts relevant to the document;
   deriving one or more relevant facts from the query document by identifying one or more fact triples of three categorical elements in the back-end fact-base;
   identifying one or more inconsistencies between the one or more relevant facts from the document and the facts stored in the back-end fact-base; and
   providing a response to the query document, wherein the response additionally includes the one or more identified inconsistencies.

2. The method of claim 1, further comprising presenting the response to a user.

3. The method of claim 1, wherein the back-end fact-base comprises unstructured and semi-structured documents.

4. The method of claim 1, further comprising constructing an extensible markup language back-end fact-base from at least one of one or more source documents and one or more fact-bases.

5. The method of claim 1, wherein comparing the query document with a back-end fact-base comprises determining one or more relevant facts from the back-end fact-base given the one or more facts contained in the document.

6. The method of claim 1, wherein the method is run on a system, wherein the system comprises one or more distinct software components, each of the one or more distinct software components being embodied on a tangible computer-readable recordable storage medium, and wherein the one or more distinct software modules comprise a fact-base builder component, a relevance estimator component, a facts tagger component and an inconsistency detector component executing on a hardware processor.

7. A computer program product comprising a tangible computer readable recordable storage medium including computer useable program code for identifying one or more inconsistencies between an unstructured document and a back-end fact-base, the computer program product including:

computer useable program code for automatically parsing a query document and comparing the document with a back-end fact-base comprising facts relevant to the document;

computer useable program code for deriving one or more relevant facts from the query document by identifying one or more fact triples of three categorical elements in the back-end fact-base;

computer useable program code for identifying one or more inconsistencies between the one or more relevant facts from the document and the facts stored in the back-end fact-base; and computer useable program code for providing a response to the query document, wherein the response additionally includes the one or more identified inconsistencies.

8. The computer program product of claim 7, further comprising:

computer useable program code for presenting the response to a user.

9. The computer program product of claim 7, wherein the back-end fact-base comprises unstructured and semi-structured documents.

10. The computer program product of claim 7, further comprising:

computer useable program code for constructing an extensible markup language back-end fact-base from at least one of one or more source documents and one or more fact-bases.

11. The computer program product of claim 7, wherein the computer useable program code for comparing the query document with a back-end fact-base comprises computer useable program code for determining one or more relevant facts from the back-end fact-base given the one or more facts contained in the document.

12. The computer program product of claim 7, wherein the computer usable program code comprises one or more distinct software modules, and wherein the one or more distinct software modules comprise a fact-base builder component, a relevance estimator component, a facts tagger component and an inconsistency detector component executing on a hardware processor.

13. A system for identifying one or more inconsistencies between an unstructured document and a back-end fact-base, comprising:

a memory; and at least one processor coupled to the memory and operative to:

automatically parse a query document and comparing the document with a back-end fact-base comprising facts relevant to the document;

derive one or more relevant facts from the query document by identifying one or more fact triples of three categorical elements in the back-end fact-base;

identify one or more inconsistencies between the one or more relevant facts from the document and the facts stored in the back-end fact-base; and provide a response to the query document, wherein the response additionally includes the one or more identified inconsistencies.

14. The system of claim 13, wherein the at least one processor coupled to the memory is further operative to present the response to a user.

15. The system of claim 13, wherein the back-end fact-base comprises unstructured and semi-structured documents.

16. The system of claim 13, wherein the at least one processor coupled to the memory is further operative to:

construct an extensible markup language back-end fact-base from at least one of one or more source documents and one or more fact-bases.

17. The system of claim 13, wherein the at least one processor coupled to the memory operative to compare the query document with a back-end fact-base is further operative to determine one or more relevant facts from the back-end fact-base given the one or more facts contained in the document.

18. The system of claim 13, further comprising a tangible computer-readable recordable storage medium having one or more distinct software modules embodied thereon, the one or more distinct software modules comprising a fact-base builder component, a relevance estimator component, a facts tagger component and an inconsistency detector component executing on a hardware processor.

* * * * *